US 6,171,197 B1

(12) United States Patent
Boucquey

(10) Patent No.: US 6,171,197 B1
(45) Date of Patent: Jan. 9, 2001

(54) TRANSMISSION COUPLING DEVICE

(75) Inventor: Paul Egide Boucquey, Brussels (BE)

(73) Assignee: Esco Transmissions, Diegem (BE)

( * ) Notice: Under 35 U.S.C. 154(b), the term of this patent shall be extended for 0 days.

(21) Appl. No.: 09/254,978

(22) PCT Filed: Sep. 19, 1997

(86) PCT No.: PCT/BE97/00110

§ 371 Date: Mar. 17, 1999

§ 102(e) Date: Mar. 17, 1999

(87) PCT Pub. No.: WO98/12443

PCT Pub. Date: Mar. 26, 1998

(30) Foreign Application Priority Data

Sep. 20, 1996 (BE) ................................................ 09600795

(51) Int. Cl.[7] ...................................................... F16D 3/18
(52) U.S. Cl. .......................... 464/154; 464/904; 464/158
(58) Field of Search ............................ 464/16, 106, 147, 464/149, 153, 154, 155, 156, 162, 904, 157, 158, 159

(56) References Cited

U.S. PATENT DOCUMENTS

| 3,673,814 | * | 7/1972 | Carman | 64/9 |
| 4,443,205 | * | 4/1984 | Grant | 464/16 |
| 5,393,267 | * | 2/1995 | Munyon | 464/156 |
| 5,911,630 | * | 6/1999 | Shigeura | 464/154 |

FOREIGN PATENT DOCUMENTS 676 555  10/1995  (EP).
677 674  10/1995  (EP).

* cited by examiner

*Primary Examiner*—Lynne H. Browne
*Assistant Examiner*—Kenneth Thompson
(74) *Attorney, Agent, or Firm*—Sughrue, Mion, Zinn Macpeak & Seas, PLLC

(57) ABSTRACT

The invention concerns a device for coupling the torque transmission between a primary shaft and a receiving shaft to enable an angular and/or radial misalignment and/or an axial displacement between the two shafts, comprising two hubs (2) each provided with an external toothing (3) normally symmetrically convex with respect to a symmetrical plane (4) and a sleeve tube (7) having an internal toothing (8) co-operating with each external toothing (3) and capable of sliding longitudinally on them, limit stop means (9) being arranged in a ring-shaped space (10) between a wall (11) bearing the external toothing (3) and part (12) of at least of one of the hubs (2) and comprising a ring-shaped stop (15) fixed to the hub (2) in the symmetrical plane (4) and, at least on one side of the stop (15), a stop pin (16, 17) associated with the stop (15), arranged in the shape of a ring of the same diameter as that of the stop (15), perpendicular to the axis (18) of the sleeve tube (7), and fixed to it.

7 Claims, 1 Drawing Sheet

TRANSMISSION COUPLING DEVICE

The present invention relates to a coupling for transmitting a torque between a drive shaft and a receiving shaft, designed to allow an angular and/or radial misalignment and/or an axial displacement between the two shafts, comprising:

two hubs each of which has external toothing usually symmetrically convex with respect to a plane perpendicular to the axis of rotation of the hub and called the plane of symmetry, and which are to be fixed, one to the drive shaft and the other to the receiving shaft, a sleeve tube which has internal toothing cooperating with each aforementioned external toothing for transmitting torque between the shafts and which can slide longitudinally along these shafts, and stop means designed to limit the longitudinal sliding of the sleeve tube with respect to at least one of the hubs.

Couplings of this kind, which are known at the present time, exhibit significant drawbacks which greatly limit their life and/or which lead to short service intervals or service costs which are considerable compared with the cost of the coupling itself.

In certain known couplings, the locating of the sleeve tube with respect to the hubs is achieved using springs. These cause contact corrosion at critical points of the coupling, and this reduces its life, among other things by contaminating the lubricant used therein. Springs can also cause an imbalance which is harmful not only to the coupling but also to the mechanisms connected to or by the coupling. This phenomenon is further amplified by any breakage and/or wearing of the springs. Another harmful effect also arises out of the natural frequency of undamped axial vibration originating from the system of moving masses and springs and which may generate axial forces which are harmful not only to the coupling itself but also to the mechanisms connected. Furthermore, the size of a system that contains springs limits the displacements and misalignment allowed by the couplings compared to a total given size thereof.

In other known couplings, the said locating of the sleeve tube is achieved using stops, but it has been found that their usual positions in the couplings cause, in the event of misalignment, a relatively large radial movement between the stop(s) on the sleeve tube and the stop(s) on the hub or hubs, and this results in contact corrosion, abrasion and therefore, in this case too, significant wear and harmful contamination of the lubricant. In the case of these couplings, it has also been found that the volume available for lubricant is limited and poorly designed to the extent that this lubricant can easily spill out, sometimes during rotation but especially when stationary.

The present invention is intended to overcome the aforementioned drawbacks, firstly by avoiding the use of springs, and secondly by analysing the operation of a coupling of the kind described hereinabove in an entirely new way and thereby determining a favourable location for the stops.

To this end, in the coupling according to the invention:

at least one of the hubs has an annular space which is centred on the axis of rotation of the hub and which extends substantially parallel to this axis between a wall bearing the external toothing and a part of the hub which is intended to attach this hub to the corresponding shaft, a web connecting the wall to the hub part, while the annular space is open at least on the same side as one of the two lateral faces of the hub, and the stop means are arranged in the annular space and therein comprise:

an annular stop which is fixed to the hub at right angles to the axis of rotation thereof, and which is located substantially in the region of the aforementioned plane of symmetry, and, at least on one side of the annular stop when considering the direction of its axis of rotation, an end stop associated with the stop, which is arranged in the form of a ring of a diameter similar to that of the annular stop, at right angles to the longitudinal axis of the sleeve tube and which is fixed thereto for example by a carrier.

In the known couplings described hereinabove, significant wear originates from a lack of sealing both insofar as there is a loss of lubricant escaping from the coupling and insofar as there is the ingress of contaminants. This lack of sealing stems, among other things, from significant radial movements which are imposed on the seals and make them ineffective, and from the wear of seals placed at the usual locations for such seals in the known couplings.

The same analysis as mentioned above has resulted in a solution to the ineffectiveness and wear of the seals mounted in the coupling of the invention being found, so that these seals no longer experience any radial displacement.

To this end, in the coupling according to the invention, a sealing ring is arranged between the hub part and the aforementioned carrier, preferably substantially at the location of the aforementioned plane of symmetry, and the said carrier also has a flange which closes the corresponding end of the sleeve tube and has an orifice through which the corresponding shaft and/or hub can pass.

Other details and features of the invention will emerge from the secondary claims and from the description of the drawings which are appended to this text and which illustrate, by way of non-limiting example, one advantageous embodiment of a coupling according to the invention.

Figure 1:
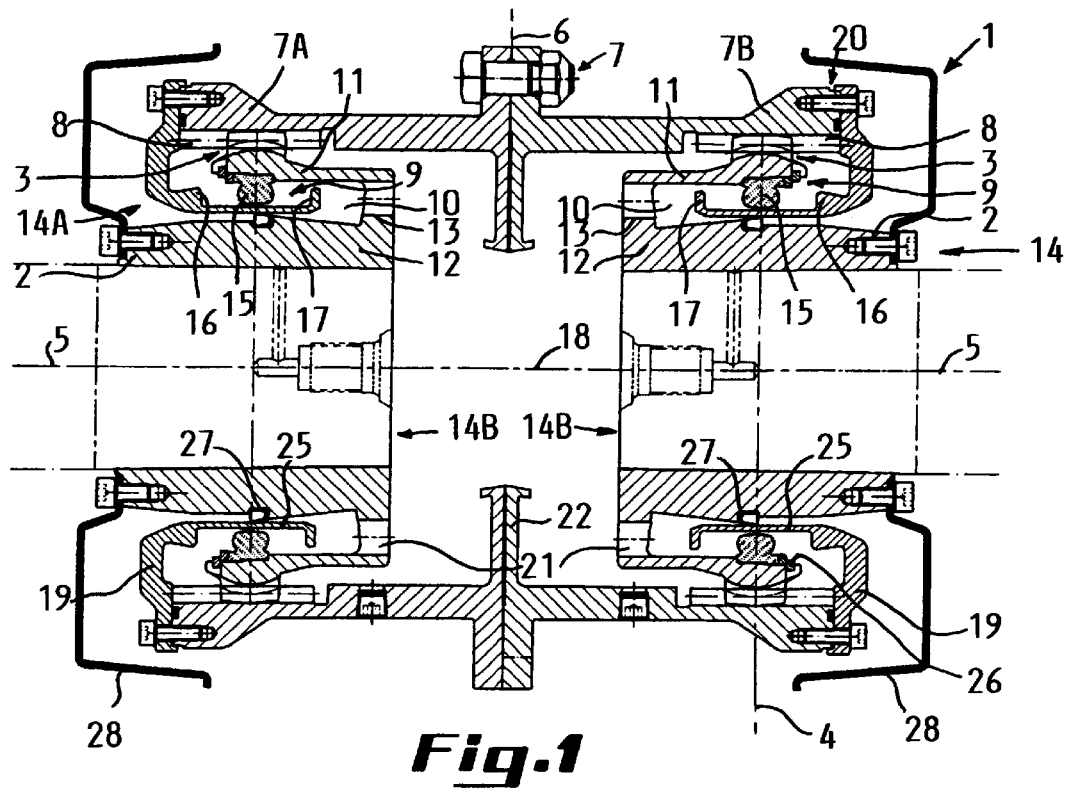
FIG. 1 depicts in axial section a coupling of the invention in an aligned starting position.

In the various figures, the same reference notations mean that the elements that bear them are identical or similar.

A coupling 1 (FIG. 1) of the invention forms part of the family of toothed couplings and comprises two hubs 2, to be mounted one on a drive shaft and the other on a receiving shaft, these being depicted in broken line and being equipped, for example, with known ducts for subjecting them to hydraulic pressure to make fitting and removal easier. The hubs 2 each comprise an external toothing 3 which is usually symmetrically convex with respect to a plane 4 perpendicular to the axis 5 of rotation of the hub 2 and called the plane of symmetry 4. The figures show a scenario in which the hubs 2 are identical, except possibly as far as their bores are concerned, and mounted with mirror symmetry with respect to a plane 6 which (FIG. 1) is perpendicular to their axes 5 of rotation when these axes are superimposed, and which is mid-way between the hubs 2 in their aligned starting position.

The coupling 1 additionally comprises a transmission sleeve tube 7 which has internal toothing 8, possibly interrupted along its length, and usually straight-cut, intended to cooperate with the external toothing 3 of each hub 2 which a view to transmitting torque from one hub 2 to the other. The sleeve tube 7 can slide longitudinally along the two external toothings 3 so as to allow an angular and/or radial misalignment and/or an axial displacement between the two hubs 2 and therefore between the two shafts that bear these hubs.

Stop means 9 are arranged in the coupling 1 to limit the longitudinal sliding of the sleeve tube 7 with respect to the hubs 2.

According to the invention, at least one of the hubs 2 (both according to the figures) has an annular space 10 centred on the axis 5 of rotation of the hub 2 and which extends parallel to this axis 5 between a wall 11 of the hub 2, which bears the external toothing 3, and a part 12 of the hub 2, which is intended for attaching this hub to the corresponding shaft. A web 13 connects the wall 11 to the part 12. The annular space 10 is open at least on the same side as one of the two lateral faces of the hub 2, the face 14A in the drawings.

According to the invention, the stop means 9 are arranged in this annular space 10. They comprise, on the one hand, an annular stop 15 which is fixed to the hub 2 itself, so as to be perpendicular to the axis 5 of rotation thereof and which is located practically at the location of the aforementioned plane of symmetry 4 of the toothing 3 of the hub 2 in question. The stop means 9 additionally comprise, associated with the stop 15, at least one end stop 16 or 17, which is then located on one side of the annular stop 15 (when considering the direction of the corresponding axis 5 of rotation). This end stop 16, 17 is arranged in the form of a ring perpendicular to the longitudinal axis 18 of the sleeve tube 7 and has a diameter similar to that of the annular stop 15. The end stop 16, 17 is fixed to the sleeve tube 7.

For example (FIG. 1), the end stop 16 forms part of a flange 19 fixed to an end face 20 of the sleeve tube 7. Also for example, the end stop 17 may be borne (in a way which is not depicted) by one or more supports (not depicted) passing freely through one or more openings 21 made in the web 13 of the hub 2 and fixed, for example, to a thin section 22 of the sleeve tube 7.

The end stop or end stops 16, 17 may form a continuous or discontinuous ring.

For example, either both end stops 16 or both end stops 17 associated with the two hubs 2 may be sufficient to limit the aforementioned sliding of the sleeve tube 7 in both directions.

Either the end stop or end stops 16, 17, or preferably the annular stop 15 may be made of metal and possibly have a coating made of a damping material, for example rubber or a synthetic material 9, to eliminate the noise and metal to metal impact. However, in the case of the figures, the stop 15 is made of a damping and strong material known to those skilled in the art, and the end stops 16, 17 are made of metal. Positioning the stop means 9 at the location of the aforementioned plane of symmetry 4, between the toothings 3, 8 and the axis 5 of rotation, means that when the annular stop 15 and end stops 16, 17 are in contact there is practically only rolling with no radial relative displacement, and this considerably reduces any phenomenon of abrasion or wear between them.

Advantageously, on each side of the annular stop 15 of one or possibly both hubs 2 there is an end stop 16 and an end stop 17 which are associated with this same stop 15. The two end stops 16, 17 are then arranged one facing the other at a distance that is chosen to suit the limitation on the sliding.

In a preferred form, the web 13 is arranged away from the plane of symmetry 4, on the same side as that lateral face 14B of the hub 2, which is closest to the other hub 2. The annular stop 15 is fixed to the wall 11 and is a determined radial distance away from the said part 12 of the hub 2. The end stop or, as appropriate, both end stops 16, 17 associated with this annular stop 15 are borne by a carrier 25 which extends between the stop 15 and the said hub part 12 and which is fixed to the sleeve tube 7, advantageously at the corresponding end, for example 20, thereof.

For the purpose of fitting it, the annual stop 15 may, for example, consist of a split ring (made of metal, metal coated as above, etc.) which is elastic and the two ends of the split on which can, if necessary, be parted so that the ring can be slipped around the carrier 25 between the two end stops 16 and 17 borne thereby.

The annular stop 15 may, however, consist of any other dismantleable part(s) such as two half-rings to be fixed to or into the said wall 11, for example by a retaining ring 26.

The annular stop 15 may consist of an uninterrupted ring fixed to the said wall 11. In this case, to allow it to be fitted, one of the two end stops 16 or 17 associated with the annular stop 15 is removable from the carrier 25 so that the stop 15 can be slipped around the carrier 25.

The carrier 25 advantageously has, between the two end stops 16, 17 associated with the annular stop 15, a wall, at least the internal face of which is cylindrical along the longitudinal axis 18 of the sleeve tube 7.

To seal the coupling 1 as mentioned earlier, this coupling may comprise a sealing ring 27, for example of a type depicted in FIG. 1, arranged between the hub part 12 and the aforementioned carrier 25. This sealing ring 27 may be arranged preferably practically at the location of the aforementioned plane of symmetry 4 so that it experiences practically no radial displacement when the axis of rotation 5 and the longitudinal axis 18 are misaligned. When, in addition, the carrier 25 comprises (FIG. 1) the aforementioned flange 19 designed to close the corresponding end 20 of the sleeve tube 7 and which has an orifice for the corresponding shaft equipped with the hub 2 and/or the hub 2 to pass, it has been found that it is possible to obtain a favourable design of coupling with a chamber that is sufficient and well enough set out to contain, without overflowing, even when stationary, a sufficient reserve of lubricant, especially in the region of the toothings 3 and 8 and to provide perfect sealing in both directions, both against a loss of lubricant and against the ingress of contaminants.

It must be understood that the invention is not in any way restricted to the embodiments described and that many modifications can be made thereto without departing from the context of the present invention or from the scope of the attached claims.

Thus, other forms of sealing ring known to the person skilled in the art, or several of these, may be mounted on the hub 2 or possibly even on the carrier 25 so that, for example, the lip of a ring prevents lubricant from escaping and the lip of another ring prevents the ingress of contaminants.

Figure 2:
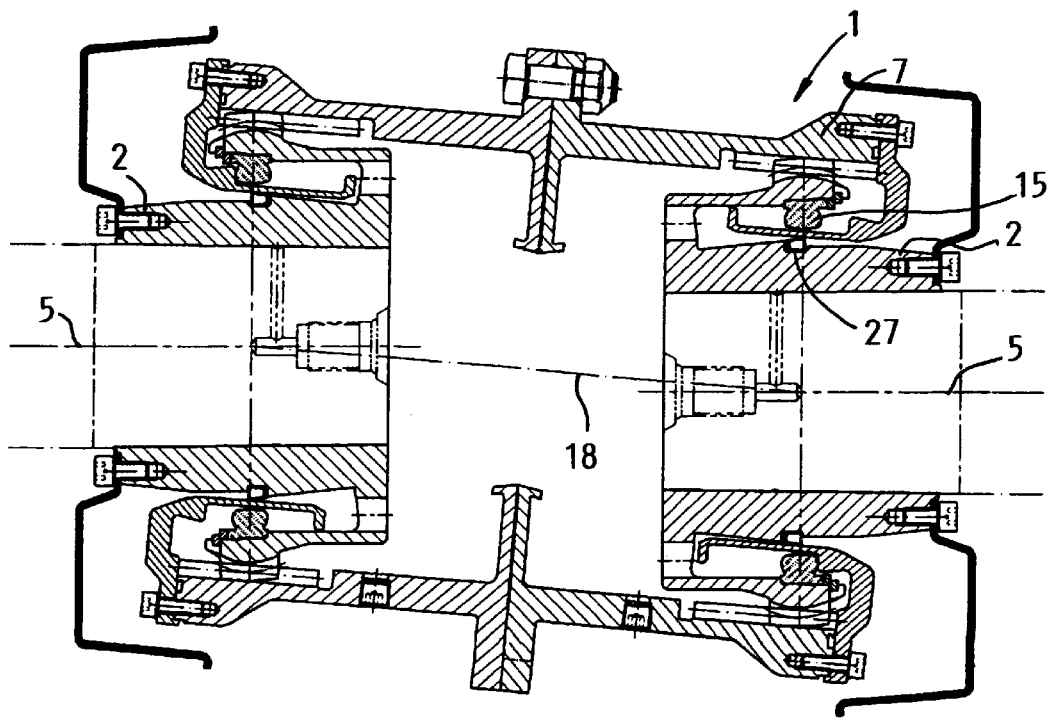
FIG. 2 depicts, in the same way, the same coupling in a position of maximum permissible misalignment.

The special shape given to the external contour of the hub part 12 to allow angular misalignment as depicted in FIG. 2 without there being any contact between the carrier 25 and this hub part 12, will also be noted.

As is also shown in the figures, caps 28 may be fixed to the hubs 2 to protect the hub and/or shaft passage openings against direct attack in the case of couplings that are exposed to dust, splashes of water, etc., on the underside of a vehicle for example.

The sleeve tube 7 may comprise two half sleeve tubes 7A and 7B which are substantially identical and are fitted together in a dismantleable way.

What is claimed is:

1. Coupling for transmitting a torque between a drive shaft and a receiving shaft,
    designed to allow one or more of an angular and radial misalignment and an axial displacement between the two shafts,
    comprising:
        two hubs (2) each of which has external toothing (3) usually symmetrically convex with respect to a plane of symmetry (4) perpendicular to the axis (5) of rotation of the hub (2) and which are to be fixed, one to the drive shaft and the other to the receiving shaft, a sleeve tube (7) which has internal toothing (8) cooperating with each aforementioned external toothing (3) for transmitting torque between the shafts and which can slide longitudinally along these shafts, and stop means (9) designed to limit the longitudinal sliding of the sleeve tube (7) with respect to at least one of the hubs (2), characterized in that:

at least one of the hubs (2) has an annular space (10) which is centred on the axis (5) of rotation of the hub (2) and which extends substantially parallel to this axis (5) between a wall (11) bearing the external toothing (3) and a part (12) of the hub (2) which is intended to attach this hub to the corresponding shaft, a web (13) connecting the wall (11) to the hub part (12), while the annular space (10) is open at least on the same side as one (14A) of the two lateral faces of the hub, and the stop means (9) are arranged in the annular space (10) and therein comprise:

an annular stop (15) which is fixed to the hub (2) at right angles to the axis (5) of rotation thereof and which is located substantially in the region of the aforementioned plane of symmetry (4), and, at least on one side of the annular stop (15) when considering the direction of its axis (5) of rotation, an end stop (16, 17) associated with the stop (15), which is arranged in the form of a ring of a diameter similar to that of the annular stop (15), at right angles to the longitudinal axis (18) of the sleeve tube (7) and which is fixed thereto.

2. Coupling according to claim 1, characterized in that, on each side of the annular stop (15) there is an aforementioned end stop (16, 17) associated therewith, two end stops (16, 17) being arranged one facing the other at a distance that is chosen to suit the limit on the sliding.

3. Coupling according to claim 2, characterized in that:

the aforementioned web (13) is placed away from the plane of symmetry (4), on the same side as the lateral face (14B) of the hub (2) closest to the other hub (2), the annular stop (15) is fixed to the wall (11) bearing the toothing (3) and is at a radial distance from the said hub part (12), and the end stop (16, 17) and as appropriate the two end stops (16, 17) associated with the annular stop (15) are borne by a carrier (25) which extends between the annular stop (15) and the said part (12) of the hub and which is fixed to the sleeve tube (7).

4. Coupling according to claim 3, characterized in that the said carrier (25) has, between the two end stops (16, 17) associated with the annular stop (15), a wall, at least the internal face of which is cylindrical along the longitudinal axis (18) of the sleeve tube (7).

5. Coupling according to claim 3, characterized in that a sealing ring (27) is arranged between the hub part (12) and the aforementioned carrier (25), (4), and in that the said carrier (25) also has a flange (19) which closes a corresponding end (20) of the sleeve tube (7) and has an orifice through which the corresponding shaft and hub (2) can pass.

6. The coupling according to claim 3, wherein said carrier is fixed to a corresponding end of said sleeve tube.

7. The coupling according to claim 5 wherein said sealing ring is arranged at the location of said plane of symmetry.

\* \* \* \* \*